United States Patent [19]

Ip et al.

[11] 4,042,456
[45] Aug. 16, 1977

[54] NUCLEAR FUEL STRING ASSEMBLY

[75] Inventors: Anthony Kwok-Chun Ip; Ken Koyanagi; Walter Renald Tarasuk, all of Peterborough, Canada

[73] Assignee: Canadian General Electric Company Limited, Toronto, Canada

[21] Appl. No.: 667,419

[22] Filed: Mar. 16, 1976

[51] Int. Cl.² .............................................. G21C 3/30
[52] U.S. Cl. ........................................ 176/78; 176/76
[58] Field of Search ..................... 176/73, 75, 76, 78

[56] References Cited

U.S. PATENT DOCUMENTS

| | | | |
|---|---|---|---|
| 3,239,426 | 3/1966 | Waine | 176/78 |
| 3,393,128 | 7/1968 | Obertelli | 176/78 |
| 3,746,617 | 7/1973 | Iwao | 176/76 |
| 3,746,618 | 7/1973 | Nakazato | 176/76 |
| 3,936,349 | 2/1976 | Prescott | 176/78 |
| 3,940,314 | 2/1976 | Knodler | 176/78 |

FOREIGN PATENT DOCUMENTS

| | | | |
|---|---|---|---|
| 1,086,356 | 8/1960 | Germany | 176/78 |
| 1,055,008 | 1/1967 | United Kingdom | 176/78 |

Primary Examiner—Samuel W. Engle
Assistant Examiner—Donald P. Walsh
Attorney, Agent, or Firm—R. A. Eckersley

[57] ABSTRACT

A reactor fuel system has fuel pins secured to respective carrier rings as an inner sub-assembly and an outer sub-assembly for mutual telescoping relation, with radial spacing thimbles interconnecting the two assemblies and also permitting interconnection to adjacent assemblies to ensure axial coincidence of cooling flow paths. In the case of booster fuel of annular section, which may be rod-mounted for ready insertion into and withdrawal from the reactor core, the center passages of respective pins are brought into axial alignment to foster effective coolant circulation therethrough.

10 Claims, 7 Drawing Figures

NUCLEAR FUEL STRING ASSEMBLY

This is a continuation-in-part of application Ser. No. 433,058 filed Jan. 14, 1974, now abandoned.

This invention is directed to nuclear fuel and in particular to rodded fuels suitable for use in pressure tube type reactors and in pressure vessel type reactors.

In the operation of nuclear reactors the arrangement of reactor fuel plays a significant part, both as to the fabrication cost of the fuel and the functional characteristics of the fuel.

In the case of booster fuels suitable for use in CANDU reactors, there exists the requirement of providing an elongated fuel assembly, usually comprising a plurality of fuel bundles mounted on a suitable carrier for introduction to and withdrawal from the reactor.

One desirable requirement in the effective management of nuclear reactors is the capability of rearranging the axial order of fuel bundles after exposure within the reactor, to exchange low burn-up positions for high burn-up positions and vice versa in order to extend burn-up or exposure life. This requires a capability for disassembly from off the central rod.

A further desired characteristic of multi-row fuel bundles having two or more annular rings or rows of elements in each bundle is the structural capablity of accommodating differential axial expansion between inner and outer rows of bundles.

A further desired characteristic is the capability of providing fuel bundles each fabricated as a pair of sub-assemblies which may then be readily assembled, disassembled and perhaps reassembled with a respective sub-assembly of another bundle.

Certain prior art arrangements utilize elongated fuel strings. In the case of U.S. Pat. No. 3,239,426, Waine et al, there is provided a nuclear fuel assembly secured within graphite sleeves, having a pair of end-stacked fuel bundles each having a plurality of parallel sheathed fuel rods, with an open work of fuel rod support structure made of stainless steel strip. The generally septagonal strip is used for intermediate and end supports.

Components are welded up within a U-section annular ring to provide a complex rod support structure, to receive the ends of the fuel rods or pins. In addition, a like arrangement of assembled strip components is provided intermediate the rod ends, to limit transverse bowing of the rods when in operation.

This prior arrangement suffers from the particular disadvantage that the fuel bundles have to be laboriously assembled rod by rod, and are not suited to assembly as sub-sections.

The matter of fabrication and assembly is further complicated by the complexity of the support structure. This support structure does not make provision for relative differential axial expansion between radially inner and radially outer rows of fuel elements.

Furthermore, there is no provison for ready disassembly or reassembly of fuel sub-assemblies, to permit improved effeciency in achieving higher burn-up, by rearranging the relative axial position of desired bundles or bundles sub-assemblies on a string of fuel bundles.

The existence of fins or wires on the outside of the individual fuel rods of Waine et al., severely complicates or makes impossible the ready disassembly or reassembly of the illustrated fuel components. Also, owing to the complex nature of the supporting strip arrangement, the use of a surrounding graphite sleeve appears to constitute an imperative feature of this prior art arrangement.

Another prior art arrangement, that of Gauthron in British Patent Specification No. 1,055,008 published Jan. 11, 1967 shows the build-up of a fuel bundle into a unitary structure by means of brazing or welding a first circle of canned fuel rods within a metal ring and a second coaxial circle of rods about the outside of the ring. In addition to providing an inflexible assembly system not adapted to facilitate disassembly or reassembly, the Gauthron arrangement is structurally rigid and does not lend itself to differential axial expansion between the respective inner circle and outer circle of rods.

The Waine et al and Gauthron fuel bundle arrangements are both wide-spaced, in that the respective rows of fuel rods are in no way radially overlapping. They do not lend themselves to the economy of space and high density of heat flux associated with a Candu type reactor using heavy water coolant.

The present invention provides a system of fabricating nuclear fuel in rodded form, having the fuel rods or pencils mounted between end supports, to permit substantially unrestrained thermal deformation under operating conditions within a reactor. In carrying out the method, fuel rods are secured as an inner and an outer sub-assembly, each rod attached between mounting rings secured to the rod ends. The two sub-assemblies are telescoped together and positioned by a plurality of spaced thimbles located therebetween, to provide precise positioning of the respective sub-assemblies, while permitting differential axial movement between the sub-assemblies.

The use of hollow spacer thimbles extending beyond the end of a bundle permits the assembly of bundles together in precise axial alignment and coolant flow path correlation.

The invention thus provides a fuel bundle for use in a nuclear reactor, comprising a first sub-assembly having an array of fuel rods or pins secured between a first pair of end fittings, a second sub-assembly having an array of fuel rods or pins secured between a second pair of end fittings, the first sub-assembly being arranged in telescoped relation within the second sub-assembly, and removable thimble spacing means positioned in locating relation between the two sub-assemblies.

The invention further provides a fuel bundle having two concentric rows of nuclear fuel rods, wherein the radially outer portions of the rods of the radially inner row extend within the radius of the radially inner portions of rods of the radially outer row, and thimble spacing means are interposed in symmetrical contacting relation with groups of inner and outer rods to locate the respective inner and outer rods in close, mutually non-contacting relation.

The invention further provides a fuel assembly having two fuel bundles in adjoining relation, with thimble spacing means connecting the two bundles in selectively misaligned relation to provide discontinuity in fluid flow passages at the interface between the bundles in relation to radially inner rows of elements forming the inner portions of the respective bundles, whereby in operation an improved coefficient of heat transfer will be achieved due to the generation of turbulence at the bundle discontinuity.

In addition to the enumerated characteristics, the present invention provides a simple method of fabricating fuel sub-assemblies particularly adapted for assembly into fuel bundles and bundle multiples. The sub-assemblies are particularly suited for mounting as bundle strings, as on a mounting rod. In addition to use with solid fuel rods or pencils, the method provides particular advantages in the assembly of annular section fuel pins, which includes booster fuel containing enriched fuel material. The capability of differential axial expansion between sub-assemblies particularly suits the arduous role of booster fuel, and the invention provides a characteristic capability providing accurately aligned coolant circulation passages throughout the length of a full string of assembled fuel bundles. Furthermore, the individual rods are free to bow, under thermal load, and flexibility of the arrangement is assured.

Certain embodiments of the invention are described, reference being made to the accompanying drawings, wherein.

Figure 1:
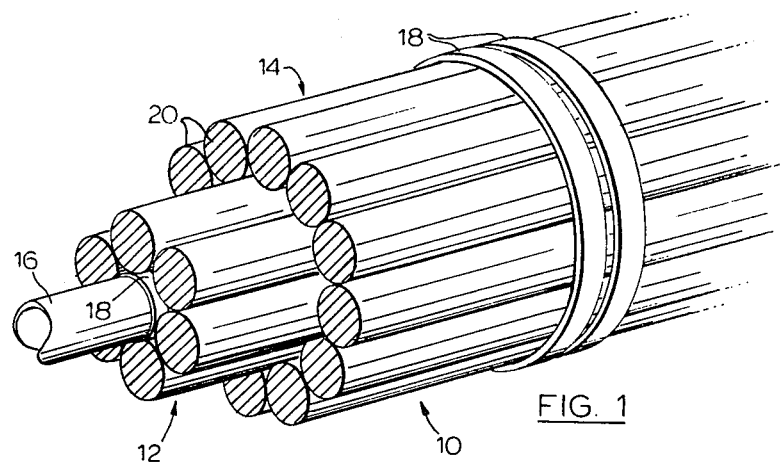
FIG. 1 is a general view of one end of a fuel bundle according to the present invention in partially assembled relation on a support rod.
Figure 2:
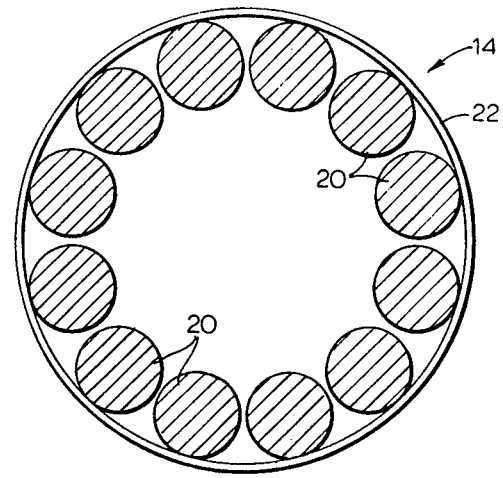
FIG. 2 is an end view of a bundle outer sub-assembly.
Figure 3:
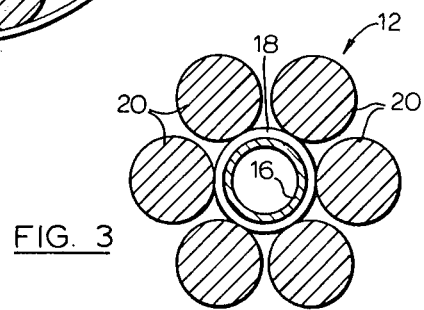
FIG. 3 is an end view of a bundle inner sub-assembly in mounted relation on an axial support rod.

Referring first to FIGS. 1, 2 and 3, the assembly 10 of FIG. 1 comprises a fuel bundle inner assembly 12 and an outer assembly 14 in mutual telescoped relation upon a central mounting rod 16. The inner assembly 12 (FIG. 3) comprises mounting rings 18 having a plurality of fuel pins 20 attached thereto, the sub-assembly 12 being shown slidably mounted on the rod 16. The fuel pins 20 are illustrated as being of solid form, but may be of annular cross-section. Each fuel pin 20 comprises a sheath and a reactive core, as is well known in the art. The outer sub-assembly 14 of FIG. 2 comprises fuel pins 20 secured to collars 22, and forming an annular sub-assembly within which the inner sub-assembly 12 can slide. The fuel pins 20 of the sub-assemblies 12 and 14 are welded or brazed to the respective mounts 18, 22.

Figure 4:
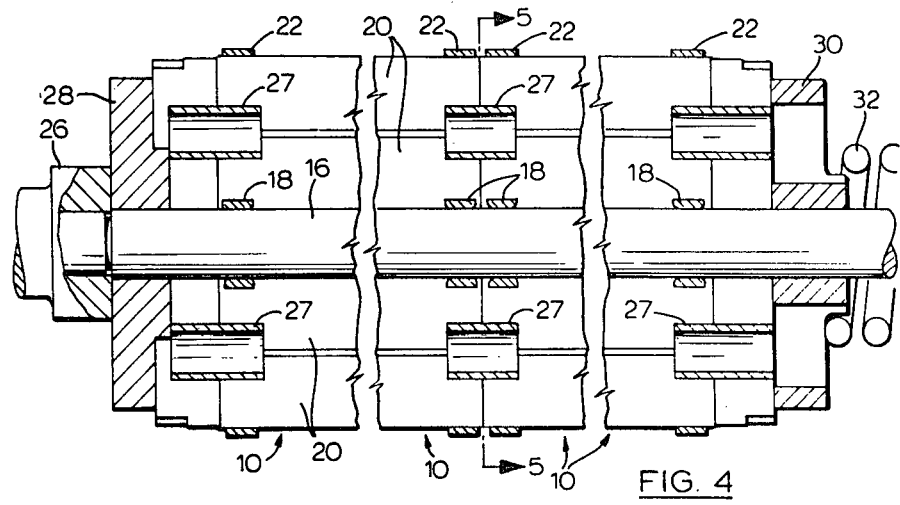
FIG. 4 is a diametrical section of a pair of fuel bundles in assembled relation on a supporting rod.
Figure 5:
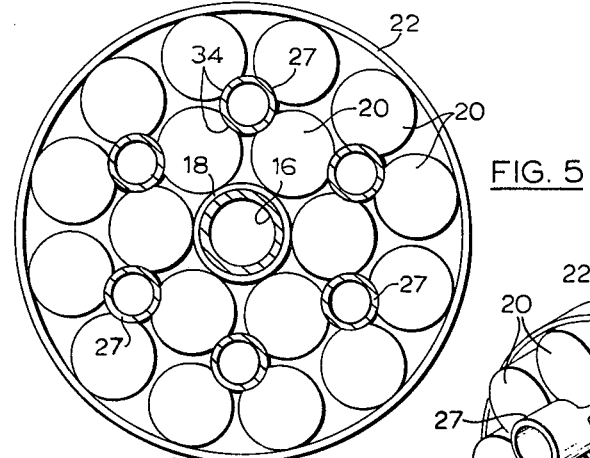
FIG. 5 is a view at 5—5 of FIG. 4.
Figure 6:
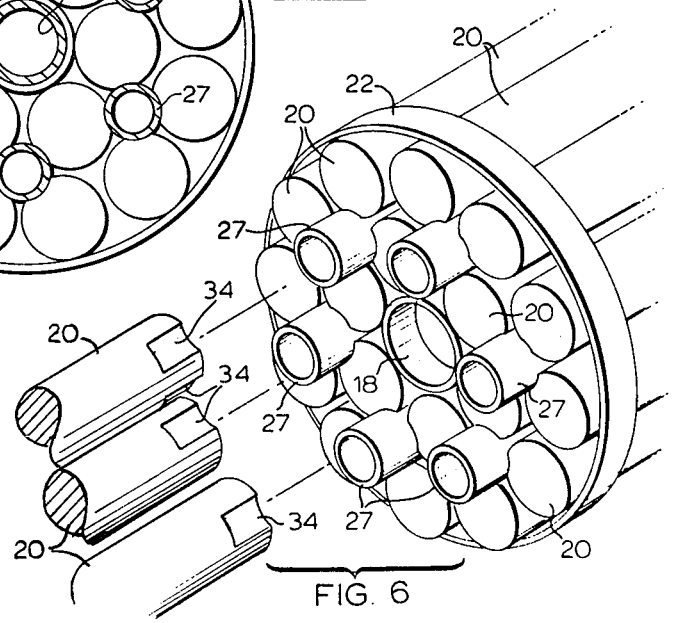
FIG. 6 is an exploded general view showing one end of one bundle assembly, with mating elements of an adjacent bundle spaced axially therefrom.

Referring to FIGS. 4, 5 and 6, there is shown a fuel string mounted on a carrier 26 having rod 16 extending therefrom, with end plates 28, 30 securing a plurality of fuel bundles 10 axially aligned relation by means of thimbles 27 and a presser spring 32.

The end portions of respective inner row fuel elements and outer row fuel elements on rods 20 are provided with recess surfaces 34 of arcuate form, to receive the cylindrical outer surfaces of thimbles 27 in centered nesting relation therewith. Thus the thimbles 27 permit the respective ends of the rods 20 of adjacent fuel bundles to come into axial contacting relation, while serving to index the rods 20 and the axial flow spaces between the rods into longitudinal coincidence.

The provision of hollow thimbles 27 and corresponding flow passages in the end plates 28, 30 provide continuous flow passages for coolant extending the length of an assembly as illustrated in FIG. 4.

Owing to the provision of radial restraint of individual rods 20 only at the ends thereof the rods are free to bow between the ends thereof under thermal load influence within a reactor core. The thimbles 27 and center support rod 16 permit differential axial expansion between the inner assemblies 12 and the outer assemblies 14.

While the thimbles 27 are illustrated as being inserted as loose members into an assembly it will be understood that they may be attached to one or other of the bundle sub-assemblies 14, 12.

Figure 7:
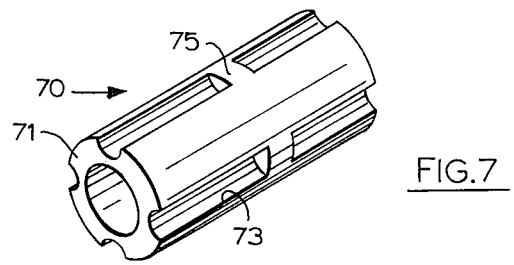
FIG. 7 shows an alternative form of spacer thimble.

In the case of the type of thimble 70 shown in FIG. 7, this is of cylindrical form having tubular portion 71 with recess walls 73, having intermediate land portions 75 serving to locate the thimble axially in the fuel string, so that it does not migrate under pressure of coolant flow, along the length of the bundle. This arrangement of thimble renders unnecessary the broaching or end milling of the recess surfaces 34, shown in the first embodiment.

This alternative arrangement would generally tend to cause gapping in the fuel string.

A further and particular advantage of the present invention, particularly for use with enriched fuel, is the ease of dis-assembly of a string assembly, for recovery of enrichment inventory from individual rods.

Another advantage provided by an arrangement of fuel bundles mounted on a supporting rod in accordance with the present invention is the provision of a fuel string having minimal neutron absorbing material intermediate the ends of the string, to provide substantial uniformity of neutron flux along the length of the string, while at the same time ensuring accurately aligned coolant flow paths extending axially of the string.

The materials of the rod sheaths and of the thimbles 27 may be selected from suitable steel or zirconium alloys, well known in the art.

It is further contemplated that the thimbles 27 or 70 may be made of material having a predetermined neutron absorption characteristic for use as flux suppressors in order to compensate for the usually present flux peaking effect at the rod ends. Stainless steel or boron enriched stainless steel may be selected for this purpose, as one example.

A further novel aspect of the present invention over the prior art, which is a highly desirable feature in certain situations, is the capability of providing a string of fuel bundles such as on a booster rod, wherein groups of rods or elements from the radially inner and radially outer rows of elements may be selectively connected in mismatched relation. Thus, by providing spacer thimbles having one axial half similar to that shown in FIG. 5, and the other axial half adapted to fit between a triad of fuel elements comprising one radially inner element and two radially outer elements, it then becomes possible to rotate one bundle by 30° about the bundle polar axis, relative to the other bundle. This has the advantage of bringing the radially inner row of elements of one bundle into axial mismatch with the inner row of elements of the adjacent bundle, and corresponding mismatch of the flow channels extending between the elements. This mismatch or selective axial misalignment introduces additional turbulance, with associated improved heat transfer coefficients.

Whilst not particularly illustrated it will be understood that in the case of providing such axial misalignment a composite thimble having two dissimilar ends may be utilized, possible incorporating characteristics of both of the types of thimble illustrated.

What we claim as new and desire to secure by Letters Patent of the United States of America is:

1. A nuclear fuel bundle for use in a nuclear reactor, comprising a first fuel rod sub-assembly having a first set of axially spaced annular rings with a first plurality of nuclear fuel rods integrally attached to radially inner surfaces of said first rings in annular array therein and extending in mutual parallel relation between the rings, a second fuel rod sub-assembly having a second set of axially spaced annular rings, with a second plurality of nuclear fuel rods integrally attached to radially outer surfaces of said second rings in annular array thereabout and extending in mutual parallel relation between the rings, said second sub-assembly being of smaller diameter than said first sub-assembly, having a radial clearance therefrom, and assembled coaxially in telescoped relation within the other said sub-assembly, and a plurality of hollow thimble means interposed between and supported by said first and second sub-assembly in contacting relation with the ends of said rods to locate said first fuel rods in radially and angularly spaced relation from said second fuel rods, to permit relative differential axial expansion between said sub-assemblies.

2. The fuel bundle as claimed in claim 1, the radial outer circumference of the smaller one of said assemblies exceeding the radial inner circumference of the larger one of said assemblies.

3. The fuel bundle as claimed in claim 1 having cylindrical surfaced recesses in the ends of said first and second fuel rods to accept axial insertion of said thimble means therein.

4. The fuel bundle as claimed in claim 1 in combination with at least one other like bundle, a plurality of said thimble means extending within both said bundles, to secure said fuel rods in respective axially aligned relation.

5. The combination as claimed in claim 4, including a central mounting rod, inserted through said second sub-assembly annular rings to support a plurality of said bundles to permit insertion of said plurality of said bundles as a booster unit within a nuclear reactor.

6. The fuel bundle combination as claimed in claim 4 wherein at least some of said thimble means are of material having a predetermined neutron absorption characteristic.

7. The fuel bundle combination as claimed in claim 4, wherein said thimble means are made of material selected from the group comprising stainless steel and stainless steel having a predetermined boron content to promote neutron absorption to a desired extent.

8. The combination as claimed in claim 4 wherein said thimble means has a plain cylindrical outer surface.

9. The combination as claimed in claim 4 wherein each said thimble means has a plurality of cylindrical surfaced recesses from the outer surface thereof, to receive the ends of said fuel rods therein.

10. The fuel bundle as claimed in claim 1 in combination with one other like bundle, a plurality of thimble means extending within both said bundles to secure selected ones of said elements in said bundles in axially misaligned relation, in order to achieve a corresponding mismatch of flow channels between said elements to promote improved heat transfer coefficients.

* * * * *